United States Patent
Thompson et al.

(10) Patent No.: US 12,102,850 B2
(45) Date of Patent: Oct. 1, 2024

(54) WIRELESS COMMUNICATION FEATURES FOR RESPIRATORY PROTECTION DEVICE

(71) Applicant: 3M INNOVATIVE PROPERTIES COMPANY, St. Paul, MN (US)

(72) Inventors: Darin K. Thompson, Huntersville, NC (US); David Allen Amero, Airdrie (CA); Graham Peter Wilson, Flintshire (GB); Eric J. Bassani, Denver, NC (US); Jeremy V. Barbee, Oxboro, NC (US); Vincent Scott Garmon, Waxhaw, NC (US); Shain Anthony Saucier, Charlotte, NC (US); Todd Ronald Hunter, Calgary (CA); Robert Heise, Calgary (CA); Michael John Zachary Norton, Calgary (CA); William Kim Ngai Sung, Calgary (CA)

(73) Assignee: 3M Innovative Properties Company, St. Paul, MN (US)

( * ) Notice: Subject to any disclaimer, the term of this patent is extended or adjusted under 35 U.S.C. 154(b) by 340 days.

(21) Appl. No.: 17/765,884

(22) PCT Filed: Oct. 1, 2020

(86) PCT No.: PCT/IB2020/059223
§ 371 (c)(1),
(2) Date: Apr. 1, 2022

(87) PCT Pub. No.: WO2021/064640
PCT Pub. Date: Apr. 8, 2021

(65) Prior Publication Data
US 2022/0339473 A1    Oct. 27, 2022

Related U.S. Application Data

(60) Provisional application No. 62/910,960, filed on Oct. 4, 2019.

(51) Int. Cl.
A62B 18/08    (2006.01)
A62B 18/02    (2006.01)
H04B 5/72    (2024.01)

(52) U.S. Cl.
CPC .............. *A62B 18/08* (2013.01); *A62B 18/02* (2013.01); *H04B 5/72* (2024.01)

(58) Field of Classification Search
CPC ......... A62B 18/08; A62B 18/02; A62B 18/04; H04B 5/72; H04B 1/385; H04B 2001/3866
(Continued)

(56) References Cited

U.S. PATENT DOCUMENTS

2005/0172959 A1    8/2005    Williams
2018/0055130 A1    3/2018    Egeland et al.
(Continued)

FOREIGN PATENT DOCUMENTS

CN    201978373 U    9/2011
CN    204169847 U    2/2015
(Continued)

OTHER PUBLICATIONS

International Search Report for PCT Application No. PCT/IB2020/059223 mailed on Jan. 13, 2021, 4 pages.

*Primary Examiner* — Eugene Yun
(74) *Attorney, Agent, or Firm* — Kenneth B. Wood

(57) ABSTRACT

A respiratory device and system, and in particular a respiratory device that is usable with a plurality of removable electronic function components that that can communicate wirelessly with other devices. In one embodiment, a respiratory device comprises a body, at least a portion of the body defining a volume; a mask communications unit (MCU) at least partially located within the volume; at least one electrical function component in communication with the MCU;

(Continued)

and a rechargeable power source at least partially located within the volume, the rechargeable power source providing power to each of the at least one electrical function components.

18 Claims, 15 Drawing Sheets

(58) Field of Classification Search
USPC .......................................................... 455/41.1
See application file for complete search history.

(56) References Cited

U.S. PATENT DOCUMENTS

| 2019/0118007 | A1 | 4/2019 | Thompson et al. |
| 2019/0118008 | A1 | 4/2019 | Thompson et al. |
| 2020/0100554 | A1* | 4/2020 | Bologna .................. A42C 2/00 |
| 2023/0080573 | A1* | 3/2023 | Riccio .................... G10L 15/22 |
| | | | 128/201.19 |

FOREIGN PATENT DOCUMENTS

| CN | 10064142 | 7/2019 |
| WO | 2005016046 A1 | 2/2005 |
| WO | 2018035207 A1 | 2/2018 |

\* cited by examiner

WIRELESS COMMUNICATION FEATURES FOR RESPIRATORY PROTECTION DEVICE

FIELD

The present technology is generally related to respiratory devices, and in particular to respiratory devices that are usable with a plurality of removable electronic function components that can communicate wirelessly with other devices.

BACKGROUND

Many modern respiratory devices, such as those used by first responders, are configured for wireless communication with other devices and/or a communications network. For example, this allows the user to communicate with other first responders in the area or with a dispatch location. However, most respiratory devices are configured to be in wireless communication with only one audio device at a time, thereby limiting the user's communications range and/or networking capabilities.

Another feature commonly included in respiratory devices is the expanded functionality offered by removable and/or interchangeable accessories coupled to the respiratory device, such as an in-mask display and/or thermal imaging camera. However, each of these accessories requires its own power source, which adds to their bulk. Further, these power sources are not shielded from extreme temperatures, such as those that may be encountered during a firefighting operation, which could result in battery failure or explosion.

SUMMARY

This disclosure generally relates to respiratory devices, and in particular to respiratory devices that are usable with a plurality of removable electronic function components that can communicate wirelessly with other devices. In one embodiment, a respiratory device comprises a body, at least a portion of the body defining a volume; a mask communications unit (MCU) at least partially located within the volume; at least one electrical function component in communication with the MCU; and a rechargeable power source at least partially located within the volume, the rechargeable power source providing power to each of the at least one electrical function components.

In one aspect of the embodiment, the body includes a chin portion that is configured to correspond to a chin of the face of the user when the user is wearing the respiratory device, the chin portion defining the volume.

In one aspect of the embodiment, the body further includes a front cover module having an electrical interface, the chin portion of the body being at least partially defined by the front cover module, the at least one electrical function component being removably couplable to the electrical interface of the front cover module.

In one aspect of the embodiment, the front cover module includes a Radio Frequency ID (RFID) component configured to allow identification of the respiratory device.

In one aspect of the embodiment, the respiratory device further comprises an electronic circuit board in electrical communication with the MCU, the electronic circuit board being at least partially located within the volume, the electronic circuit board including: a universal expansion port (UEP) connector; a near-field communication (NFC) antenna; a power switch; and a transformer.

In one aspect of the embodiment, the transformer is in electrical communication with each of the at least one electrical function components.

In one aspect of the embodiment, the respiratory device further comprises a regulator removably coupled to the body, the rechargeable power source being located between the regulator and a face of a user when the user is wearing the respiratory device.

In one aspect of the embodiment, the respiratory device further comprises a facepiece and the regulator includes an air inlet, the facepiece defining an aperture and being coupled to the body, the aperture of the facepiece being in fluid communication with the air inlet of the regulator.

In one aspect of the embodiment, the MCU includes an annular housing configured to circumscribe the aperture of the facepiece.

In one aspect of the embodiment, the annular housing of the MCU has at least one electrical connector, the at least one electrical connector being configured to be in electrical communication with the at least one electrical function component.

In one aspect of the embodiment, the at least one electrical function component includes a plurality of electrical function components, each of the plurality of electrical function components being removably couplable to the at least one electrical connector.

In one aspect of the embodiment, the rechargeable power source is configured to provide power to all of the plurality of electrical function components.

In one aspect of the embodiment, the MCU includes a wireless communication module, the wireless communication module being configured to provide simultaneous wireless communication sessions to a plurality of remote devices.

In one aspect of the embodiment, the at least one electrical function component includes at least one of a display, a thermal imaging camera, and a communication system.

In one aspect of the embodiment, the body defines an interior space configured to receive at least a portion of the face of the user, the at least one electrical function component including: a display located within the interior space defined by the body, the display having a first communications module; a thermal imaging camera, the thermal imaging camera including a second communications module configured to transmit data over a personal area network using a plurality of communications protocols; and a communications system, the communications system being a digital enhanced cordless telecommunications (DECT) system.

In one aspect of the embodiment, the display, the thermal imaging camera, and the communication system are powered simultaneously by the rechargeable power source.

In one embodiment, a respiratory device comprises: a body, at least a portion of the body being configured to contact a face of a user and at least a portion of the body defining an interior space configured to receive at least a portion of the face of the user, the body including a chin portion that is configured to correspond to a chin of the face of the user, the chin portion defining a volume therein; a mask communications unit (MCU) at least partially located within the volume; a plurality of electrical function components in electrical communication with the MCU, the plurality of electrical function components including: a display located within the interior space defined by the body, the display having a Bluetooth module; a thermal imaging camera, the thermal imaging camera including a Bluetooth/WiFi combination communications card configured to transmit data over a personal area network; and a communications module, the communications module being a digital enhanced cordless telecommunications (DECT) system; an electronic circuit board in electrical communication with the MCU, the electronic circuit board being at least partially within the volume and including: a UEP connector; a near-field communication (NFC) antenna; a power switch; and a transformer, the transformer being in electrical communication with each of the plurality of electrical function components; and a rechargeable power source at least partially within the volume, the rechargeable power source providing power to each of the plurality of electrical function components simultaneously.

In one embodiment, a mask communications unit (MCU) for a respiratory device comprises: a housing, the housing defining a central aperture, the central aperture being sized and configured to circumscribe an inlet aperture of the respiratory device; and a wireless communications module within the housing, the wireless communications module being configured to wirelessly transmit data to a plurality of remote audio devices simultaneously, the MCU being configured to be in communication with a plurality of electrical function components.

In one aspect of the embodiment, the MCU is communicatively couplable to a video display.

In one aspect of the embodiment, the MCU further comprises at least one electrical connector, the at least one electrical connector being at least partially exposed from the housing and being removably couplable to at least one of the plurality of electrical function components.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
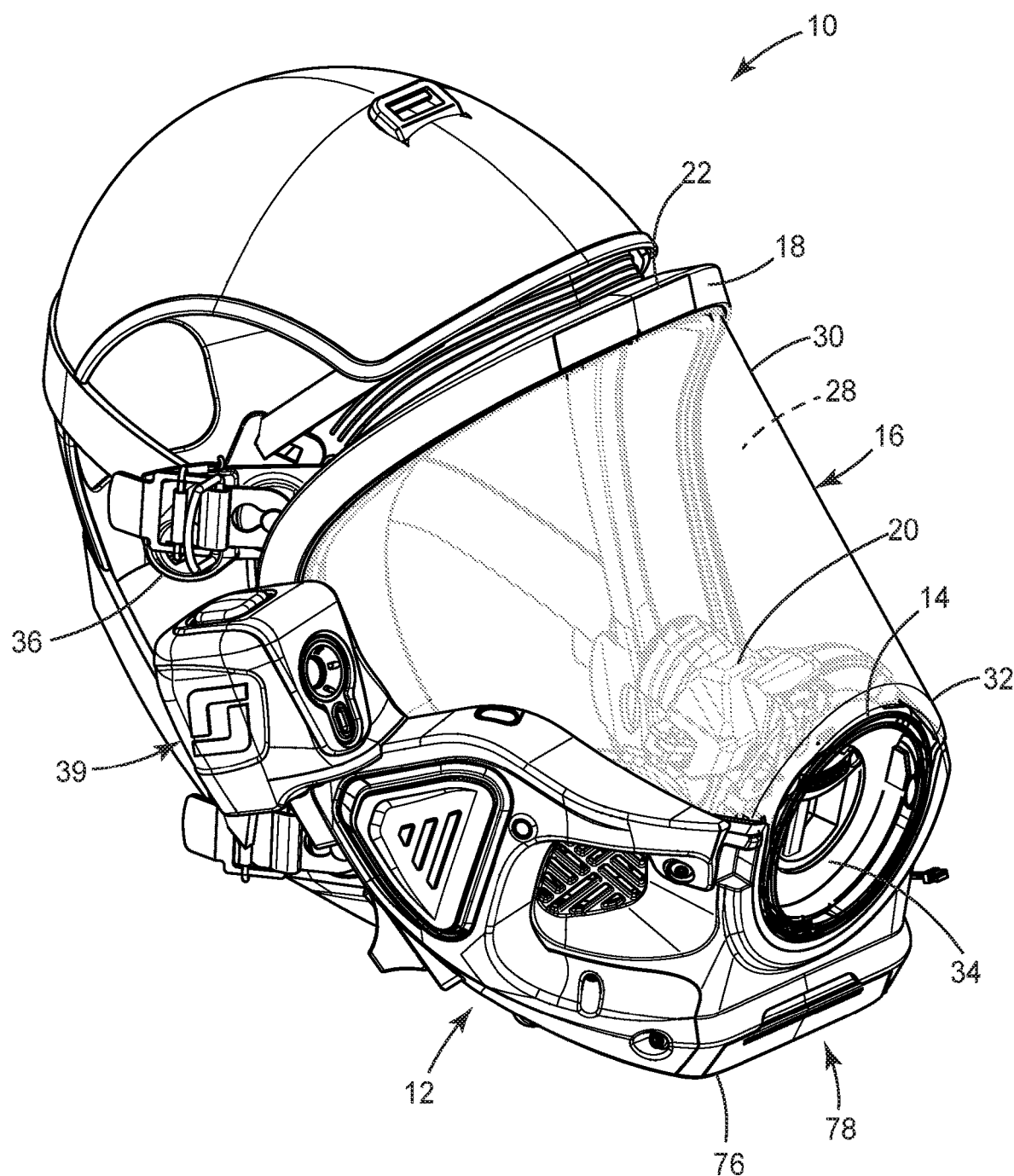
FIG. 1 shows a side perspective view of an exemplary respiratory device in accordance with the present disclosure.

The present disclosure is drawn to a respiratory device with enhanced functionality and communication as compared with known deices. In particular, the respiratory device is not only simultaneously and removably connectable to a plurality of electrical function components, but is also configured to engage in simultaneous wireless communication sessions with a plurality of remote devices using different communication protocols. Before describing in detail exemplary embodiments that are in accordance with the disclosure, it is noted that components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designations refer to like elements, an embodiment of a respiratory device constructed in accordance with the principles of the present disclosure is shown in the figures and generally designated as "10." The respiratory device 10 shown in FIGS. 1-17 generally includes a body 12 and a mask communications unit (MCU) 14. Although embodiments described and depicted herein show one MCU 14 located within the body 12 (for example, within a volume defined by the body 12), it will be understood that implementations are not limited to this configuration. It will also be understood that although in one embodiment the respiratory device is a full face mask that entirely covers the face of the user, the respiratory device may have other configurations, such as a partial or half face mask.

Figure 2:
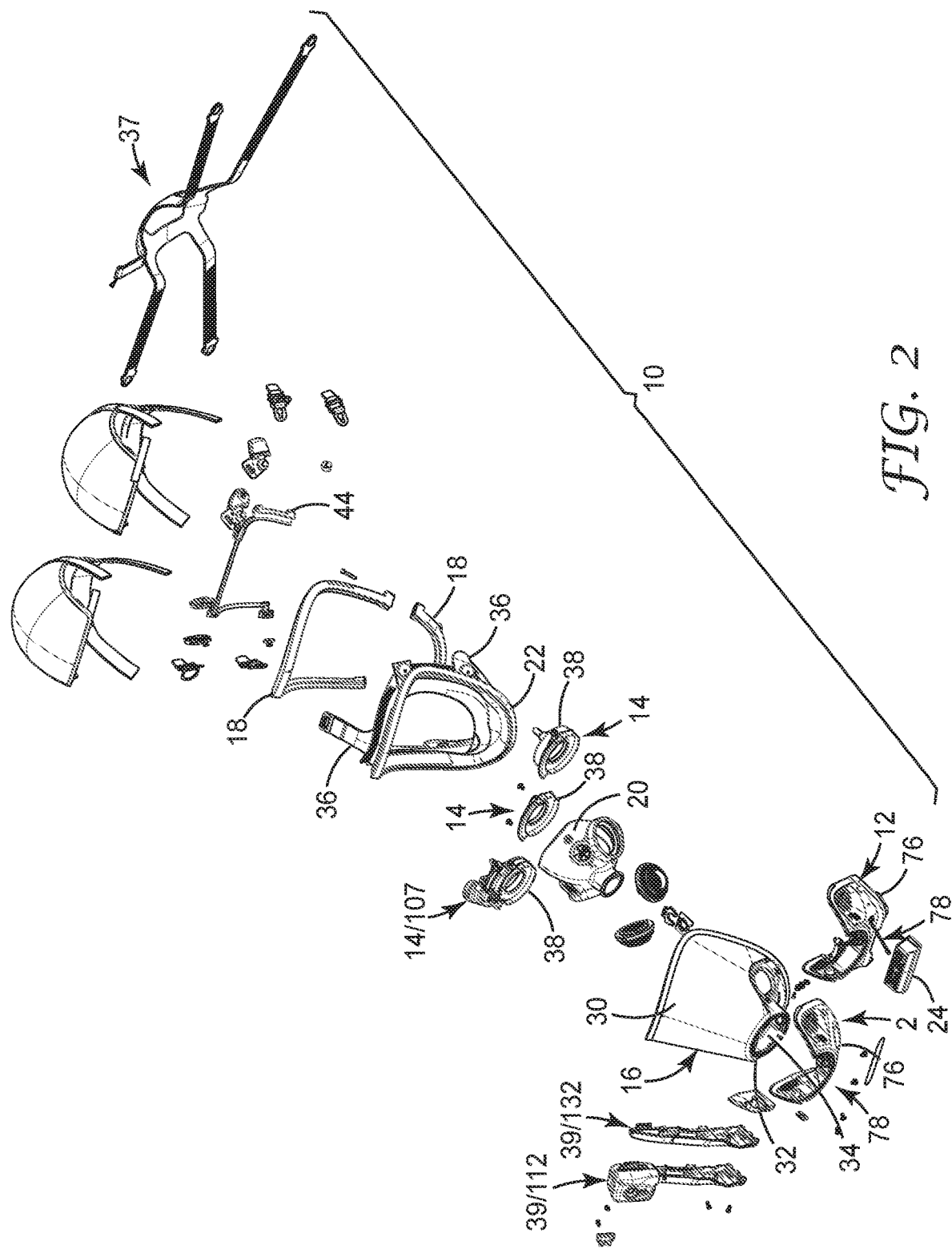
FIG. 2 shows an exploded front perspective view of the exemplary respiratory device of FIG. 1 in accordance with the present disclosure.
Figure 3:
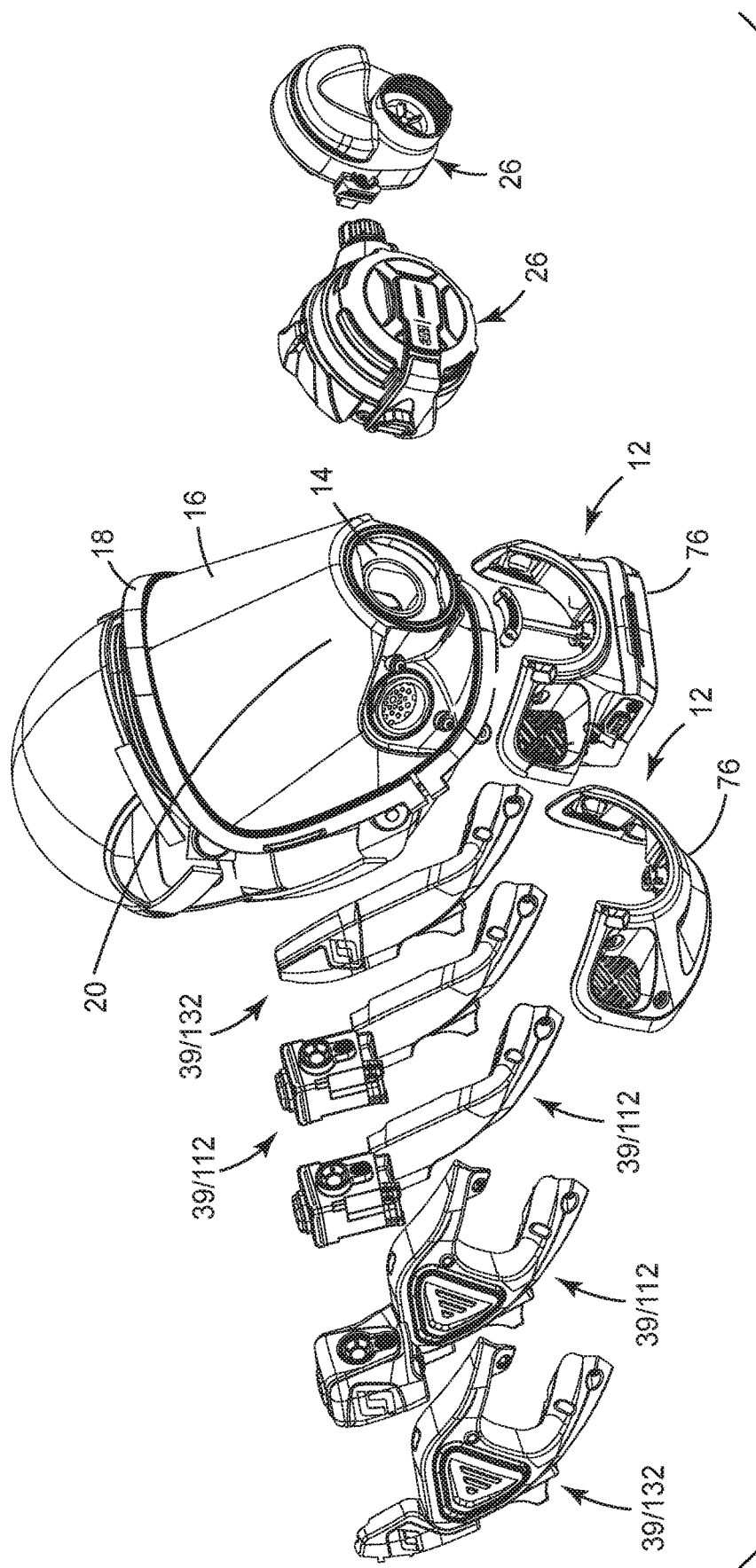
FIG. 3 shows a side perspective view of the exemplary respiratory device of FIG. 1 in accordance with the present disclosure and a plurality of interchangeable electrical function components, chin portions, and regulators.

Referring now to the drawing figures in which like reference designators refer to like elements, FIGS. 1-3 show an exemplary respiratory mask 10. FIG. 1 shows a side perspective view of the respiratory device 10, FIG. 2 shows an exploded view of the respiratory device 10, and FIG. 3 shows a side perspective view of the respiratory device and a plurality of interchangeable electrical function components, chin portions, and regulators. In one embodiment, the respiratory device 10 is a respirator mask such as those worn by first responder in an emergency situation, and includes the body 12, the MCU 14, a facepiece 16, one or more facepiece seals 18, a nosecup 20, a face engagement seal 22, and a power source 24 (such as a rechargeable battery). Further, the respiratory device 10 is configured to be used with one or more filters, regulators 26, and/or other components. However, it will be understood that the respiratory device 10 may include more or fewer components than those shown in FIGS. 1-3. For example, in one embodiment, the respiratory device 10 does not include a face engagement seal 22 or, optionally, an upper and/or lower facepiece seal 18, and/or nosecup 20, but does include one or more straps or harnesses to mount the respiratory device 10 to a user's head. Further, it will be understood that in some embodiments, components such as filter(s), filter cartridge(s), and respirator(s) are integrated with the respiratory device 10, and in other embodiments such components may be used with the respiratory device 10, but are not considered to be part of the respiratory device 10.

Continuing to refer to FIGS. 1-3, the respiratory device 10 is configured to be worn by a user, such as first responder, in environments where the user is exposed to hazardous materials, such as fire, smoke, gases, vapors, aerosols, biological agents, and/or the like. Consequently, in one embodiment the facepiece 16 is sized to fit over all or part of the user's face. For example, the facepiece 16 is sized and configured to cover the wearer's eyes, nose, and mouth. Alternatively, the facepiece 16 may be sized and configured to cover only the user's nose and mouth. The facepiece 16 is composed of transparent or translucent materials commonly used for respirator mask facepieces. The facepiece 16 at least partially defines an interior space 28 of the respiratory device 10 and further includes an interior surface and an exterior surface opposite the interior surface. Optionally, in some embodiments, the facepiece 16 includes a proximal end 30 that is closer to the user when the mask is donned, and a distal end 32 that is farther from the user when the mask is donned. The respiratory 10 also includes an aperture 34 that is sized and configured to receive at least a portion of an air regulator 26. For example, the regulator 26 may include an air inlet and the aperture 34 may be in fluid communication with the air inlet. The aperture 34 may be defined by the facepiece 16, the body 12, and/or other components of the mask. As a non-limiting example, the respirator may be an air-purifying respirator (APR), a supplied-air/self-contained breathing apparatus (SCBA), powered air-purifying respirator (PAPR), or respirators and/or filters for chemical, biological, radiological, and nuclear defense (CBRN defense). In one embodiment, the respiratory device 10 is sized and configured to be worn under a cap and a helmet of a first responder. In one embodiment, the respiratory device 10 is coupled to, or is configured to be coupled to, personal protection equipment such as a helmet and/or a cap. Embodiments are not limited to respirators with face seals. It is contemplated that other embodiments, such as respirators that do not include face seals but that use head harness components can be used.

Continuing to refer to FIGS. 1-3, in one embodiment the one or more facepiece seals 18, nosecup 20, and face engagement seal 22 are composed of flexible, hypoallergenic materials such as rubber (for example, ethylene propylene diene monomer (EPDM) rubber and/or latex-free polyisoprene), and/or silicone. The nosecup 20 is located within the interior of the respiratory device and in contact with the user face when the mask is donned. For example, the nosecup 20 may surround and enclose the user's nose and mouth. The facepiece seal(s) 18 provides a smooth interface between the edges of the facepiece 16 and the face engagement seal 22. The face engagement seal 22, in turn, provides a smooth and fluid-tight seal around the user face. Further, in one embodiment the face engagement seal 22 includes a plurality of strap coupling elements 36. The respiratory device 10 further includes a plurality of straps 37 that are couplable to the strap coupling elements 36. Alternatively, the straps may be coupled to a component of the respiratory device 10 in locations other than at the face engagement seal 22.

As shown in FIGS. 1-3, the body 12 is mounted to a portion of the facepiece 16, such as the distal end 32 of the facepiece 16. In one embodiment, the MCU 14 includes a housing 38 (discussed in greater detail below) that circumscribes the aperture 34 and securely couples the body 12 to the facepiece 16. Three exemplary MCUs 14 are shown in FIG. 2, and these are swappable or interchangeable, depending on desired use. Likewise, two exemplary bodies 12 are shown in FIG. 2, and these are swappable or interchangeable, depending on desired use. Together, the body 12, housing 38, and facepiece 16 may provide a docking port to which a regulator may be coupled and thus put into fluid communication with the nosecup 20. However, it will be understood that the MCU 14 may be at any location on or in the respiratory device 10.

As shown in FIG. 3, the respiratory device 10 may be used with any of a plurality of electrical function components 39, which are removably couplable to the body 12 and/or facepiece 16. Likewise, any of a plurality of regulators 26 may be used with the respiratory device 10. Further, in one embodiment, the regulator is configured for use with a supply of pressurized air (for example, an air cylinder as part of a self-contained breathing apparatus (SCBA)), and in another embodiment, the regulator is configured for use with a replaceable filter cartridge. Further, in some embodiments the electrical function components 39 are swappable or interchangeable and/or the regulators 26 are swappable or interchangeable when the respiratory device 10 is in use. It will be understood that more, fewer, or different electrical function components 39 and regulators 26 may be used other than those shown in FIG. 3. As shown in FIG. 2, the respiratory device 10 may further include a bone conduction communication element 41. An exemplary bone conduction element is described in PCT Publication No. WO 2018/035207 A1 (Thompson et al.), the entire contents of which are incorporated herein by reference.

Figure 4:
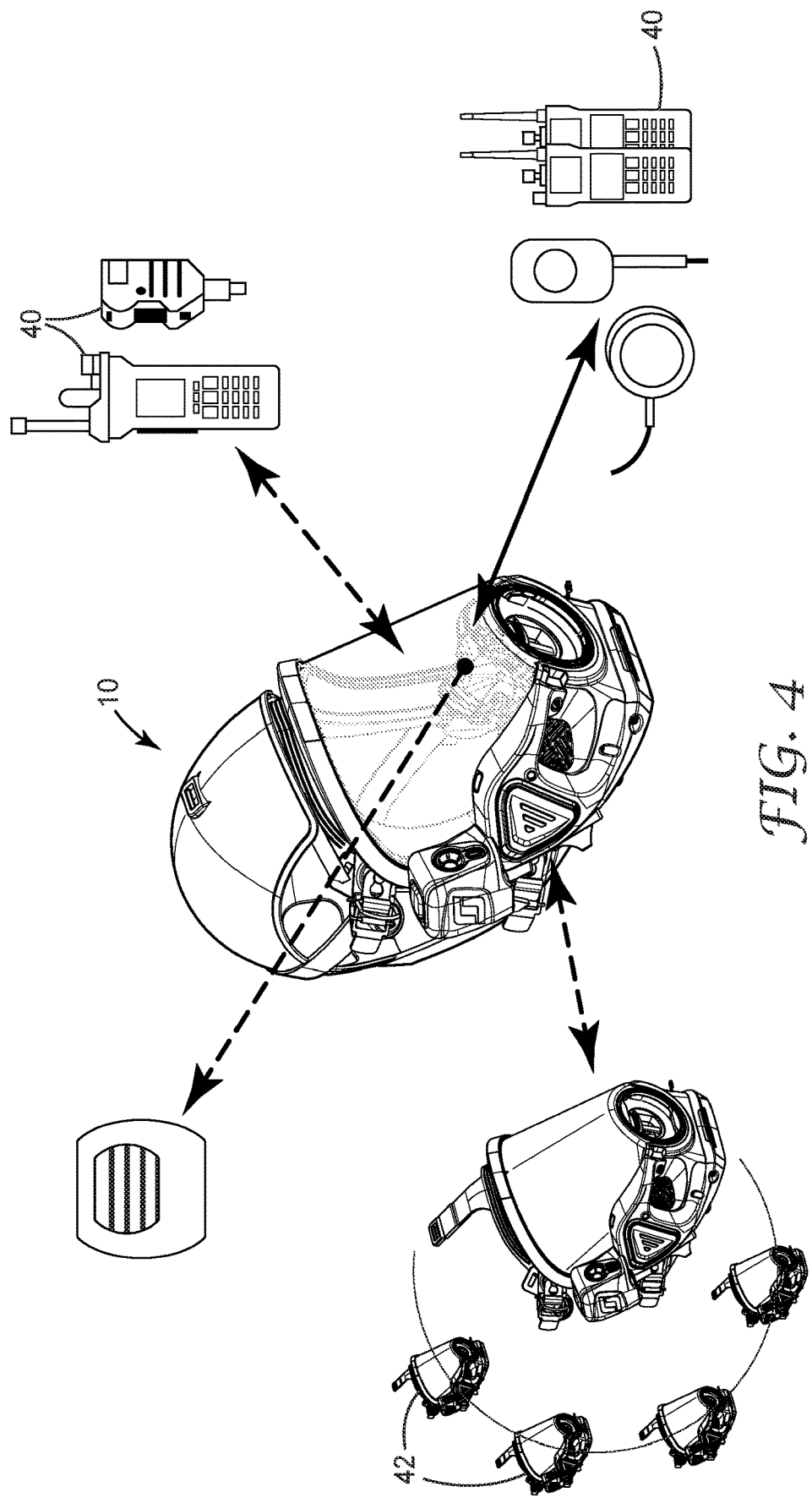
FIG. 4 shows an exemplary system view of the exemplary respiratory device of FIGS. 1 and 2 in accordance with the present disclosure, the respiratory device being in communication with a plurality of electrical function components.

Referring now to FIG. 4, an exemplary system view of the exemplary respiratory device of FIGS. 1-3 is shown. The respiratory mask 10 is generally configured to be coupled to and/or in wireless communication with a plurality of system components (referred to herein as electrical function components 39), for example, as shown in FIG. 3. Such couplings or connections may be achieved as discussed in greater detail below. In the non-limiting embodiment shown in FIG. 4, the respiratory device 10 is configured to be in wired and/or wireless communication with one or more radios 40 and with one or more other respiratory devices 42. The components of the MCU 14 are discussed below with respect to FIG. 16. Further, in one embodiment, the respiratory device 10 may include a wired RSM, push-to-talk (PTT) paddle, and facepiece PTT for radio interface communications.

Figure 5:
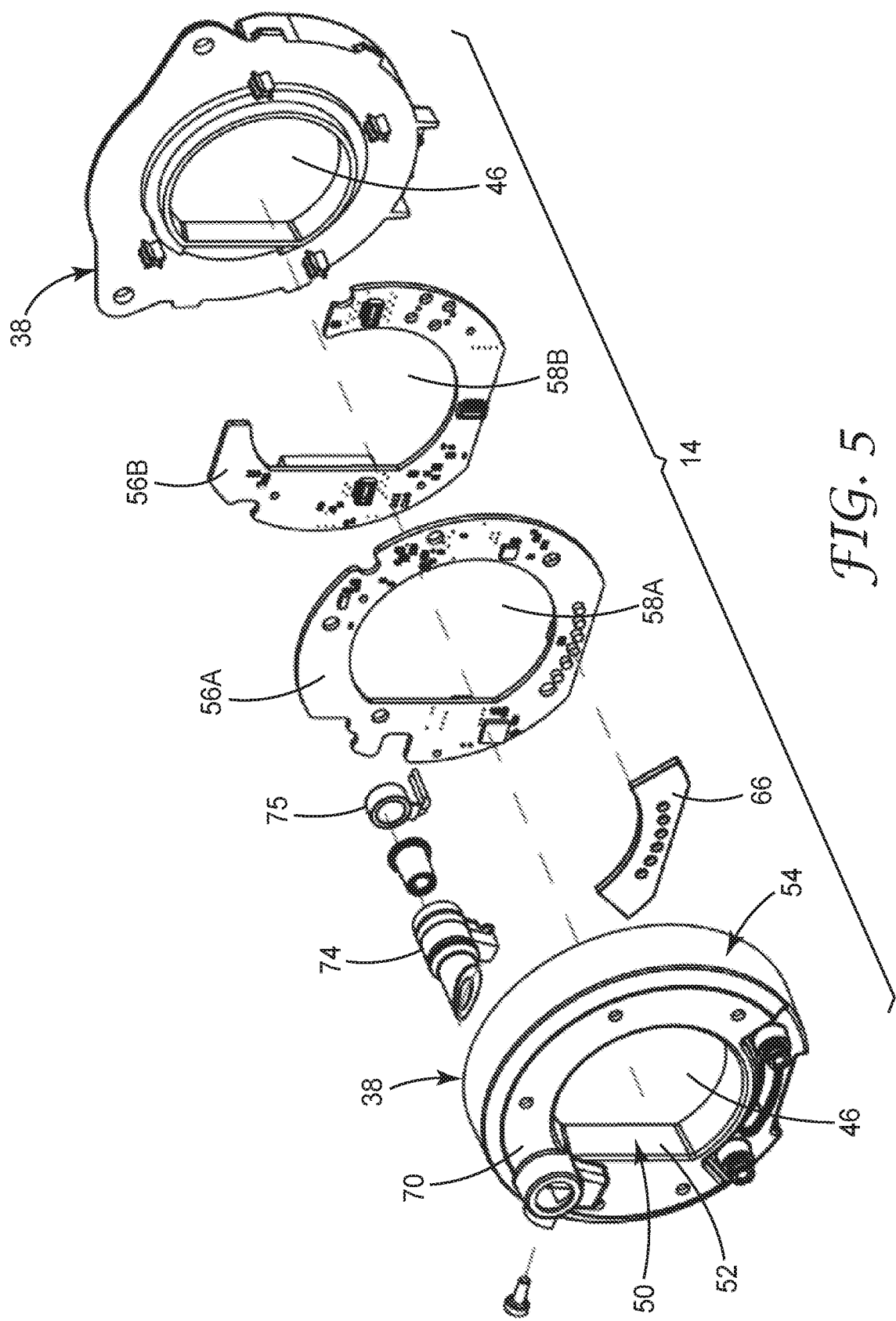
FIG. 5 shows an exploded rear perspective view of a mask communications unit (MCU) in accordance with the present disclosure.
Figure 6:
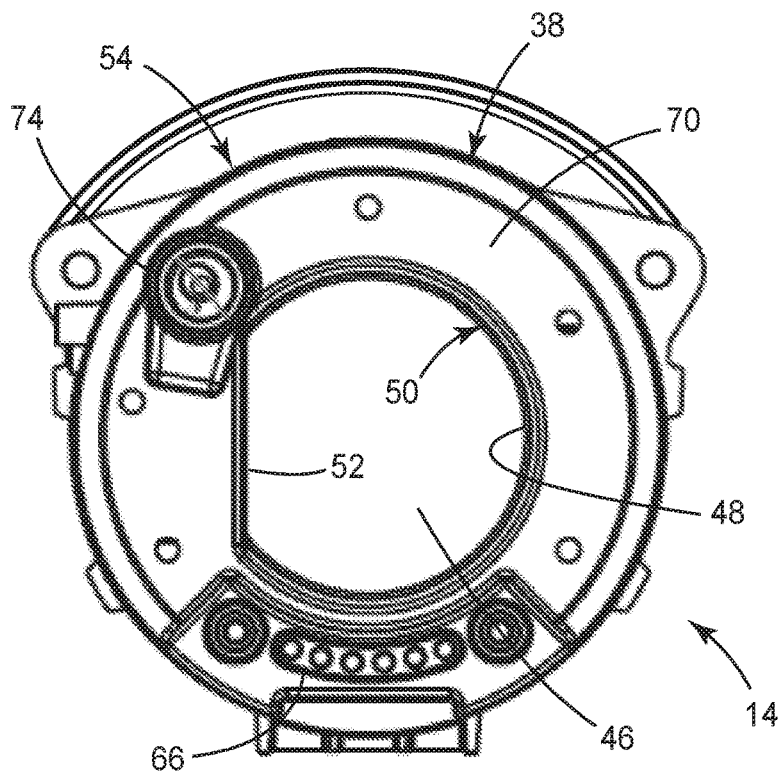
FIG. 6 shows a rear view of the MCU of FIG. 5 in accordance with the present disclosure.
Figure 7:
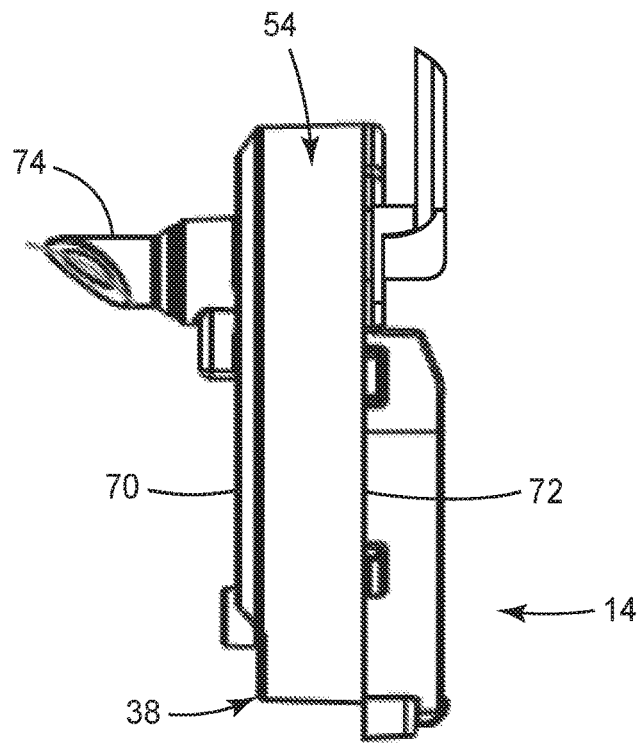
FIG. 7 shows a side view of the MCU of FIGS. 5 and 6 in accordance with the present disclosure.

Referring now to FIGS. 5-7, the MCU 14 is shown in greater detail. FIG. 5 shows an exploded view of the MCU 14, FIG. 6 shows a front view of the MCU 14, and FIG. 7 shows a side view of the MCU 14. In one embodiment, the MCU 14 includes a housing 38 generally having an annular shape and defining a central aperture 46 that is sized and configured to at least partially circumscribe the aperture 34 in the facepiece 16. Thus, in some embodiments the MCU housing 38 may be used instead of a coupling plate to securely couple the body 12 to the facepiece 16, thereby saving space and negating the need to include a bulky MCU housing 38 on or protruding from the exterior of the respiratory device 10. Alternatively, in some embodiments, the MCU housing 38 is used in addition to a coupling plate or other coupling elements. In the embodiment shown in FIGS. 5-7, the central aperture 46 is D-shaped in cross section. Put another way, a first portion 48 of an inner edge 50 of the housing 38 is curved, whereas a second portion 52 of the inner edge 50 is flat or linear (forming a cord that connects endpoints of the curved first portion 48). However, it will be understood that the central aperture 46 may have other cross-sectional shapes. Further, in some embodiments the housing 38 includes an outer edge 54 that generally follows the shape of the inner edge 50. For example, at least a portion of the outer edge 54 may be curved like the first portion 48 of the inner edge 50.

Figure 16:
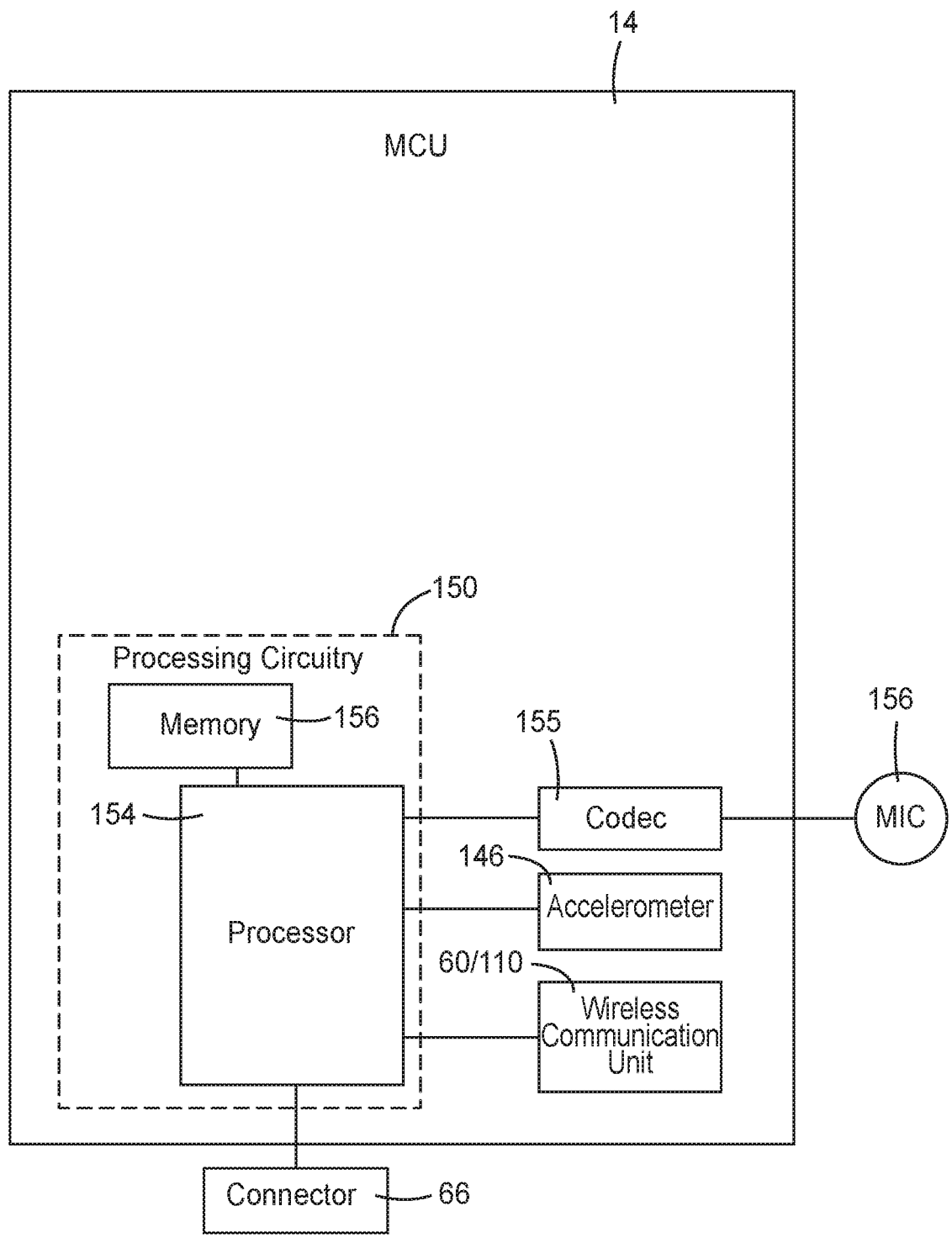
FIG. 16 shows a block diagram of electronic components of the MCU of FIGS. 4-6 in accordance with the present disclosure.
Figure 17:
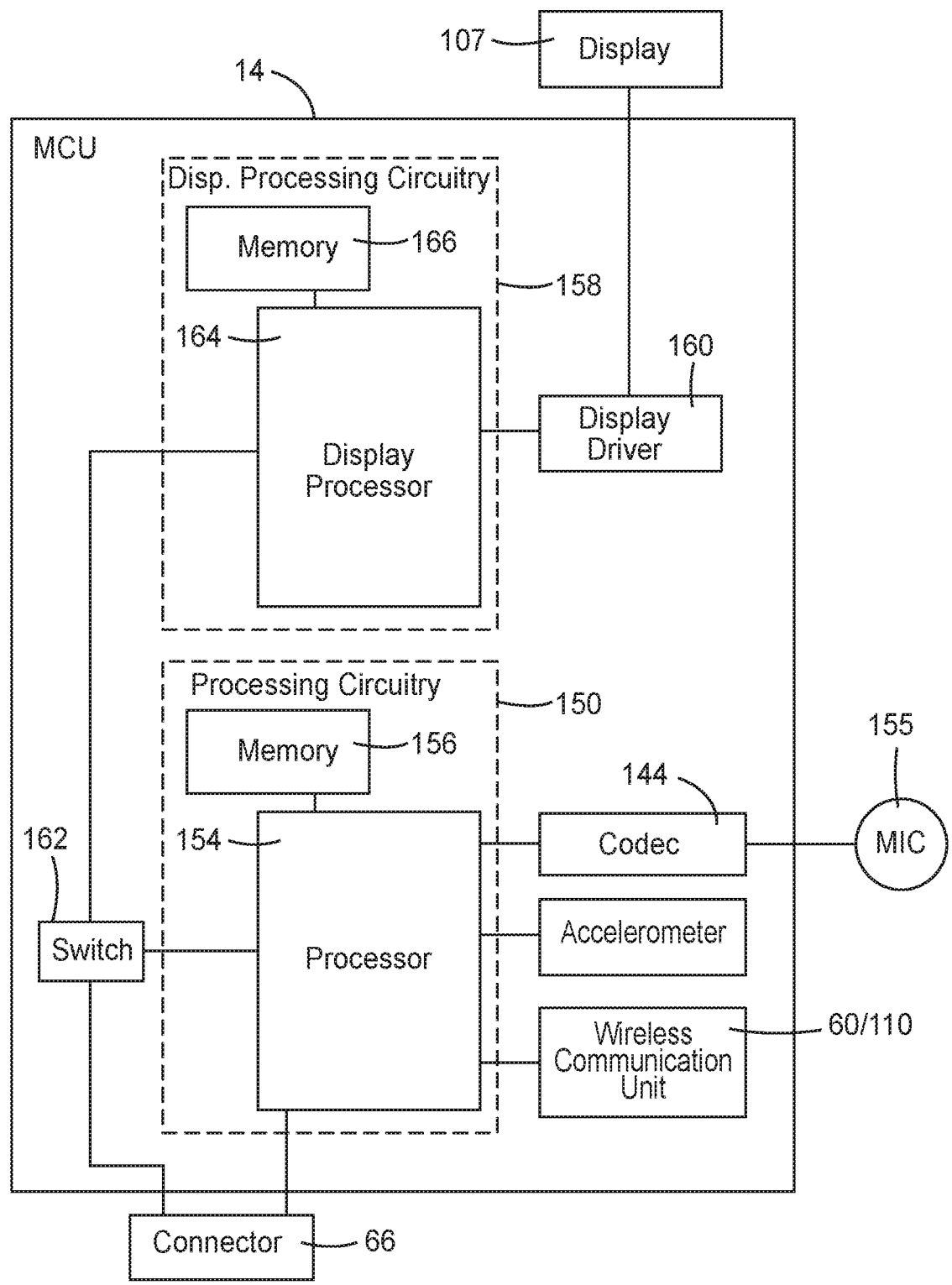
FIG. 17 shows a block diagram of electronic components of the MCU of FIGS. 11-13 in accordance with the present disclosure.

Continuing to refer to FIGS. 5-7, the housing 38 contains or at least partially encloses one or more electrical components, such as electronic circuit boards 56. In one embodiment, the MCU 14 includes a first electronic circuit board 56A and a second electronic circuit board 56B, both of which include a central aperture 58A, 58B that at least partially circumscribe the central aperture 46 defined by the housing 38. Put another way, the electronic circuit board(s) 56 are sized and configured to be contained within the housing 38 and to not interfere with the central aperture 46. In one embodiment, the MCU 14 includes a wireless communication unit or module 60 (for example, as shown in FIGS. 16 and 17), either on the electrical circuit board(s) 56 and/or at another location within the housing 38, that is configured to provide simultaneous wireless communication sessions to a plurality of remote devices simultaneously. The remote devices may include audio devices and/or data devices. In one embodiment, the wireless communication unit 60 is a Bluetooth® module that is configured to communicate sound and/or data to one or more remote devices simultaneously. For example, the remote devices may be other respiratory devices, a communications hub, computer, server, or other device.

In one embodiment, the MCU 14 also includes one or more electrical connectors 66 that, when the MCU is assembled, are in electrical communication with the electronic circuit board(s) 56. Further, each electrical connector 66 is at least partially exposed from the housing 38 to allow the electrical connector(s) 66 to be removably coupled to one or more electrical function components 39. In one embodiment, at least one electrical connector 66 has a curved shape (for example, to follow the contour of the central aperture 58).

Continuing to refer to FIGS. 5-7, in one embodiment the housing 38 is generally disk-shaped and includes a proximal side 70 and a distal side 72 opposite the proximal side 70. In one embodiment, when the respiratory device 10 is assembled, the proximal side 70 of the housing 38 faces (and may be at least partially in contact with) the nosecup 20 and the distal side 72 faces (and may be at least partially in contact with) the facepiece 16, such as at or proximate the distal end 32 of the facepiece 16. In one embodiment, the housing 38 also includes a microphone grommet 74 that protrudes through the nosecup 20 when the respiratory device 10 is assembled and that is configured to receive at least a portion of a microphone 75.

Figure 8:
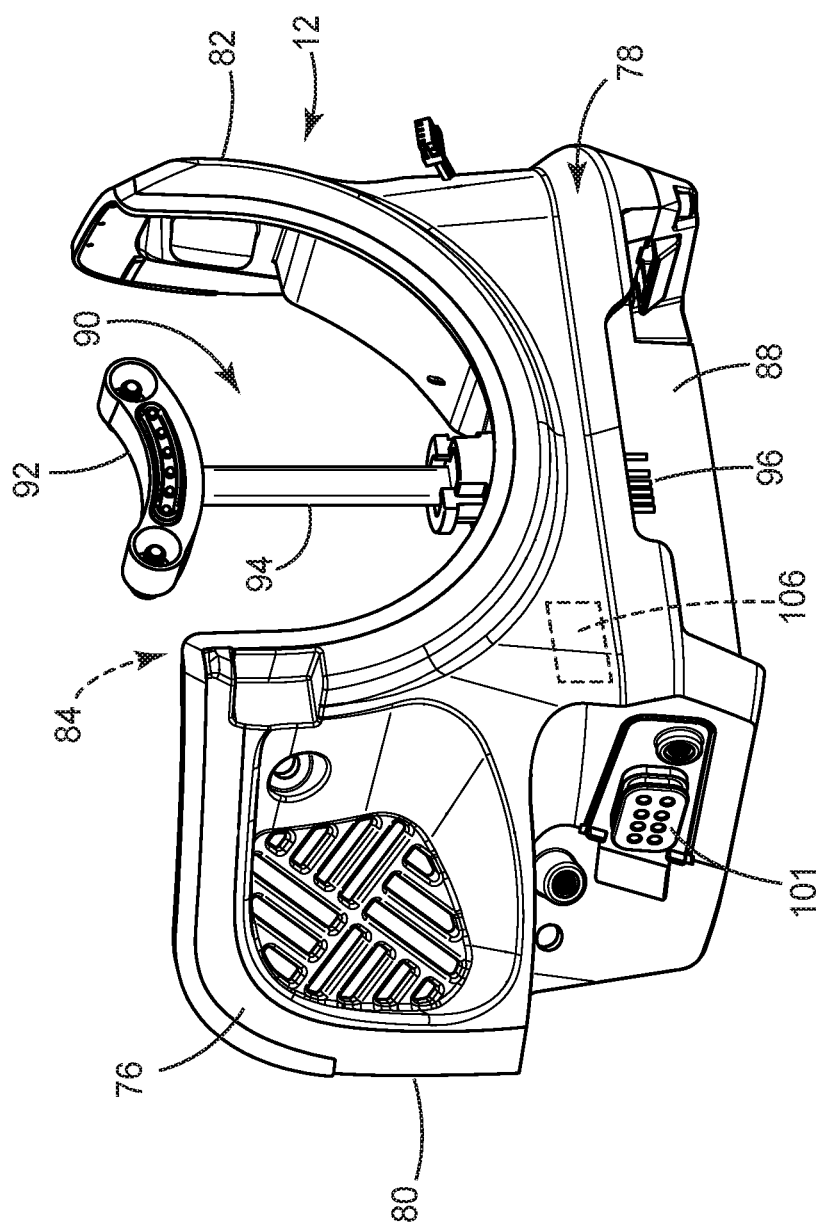
FIG. 8 shows a front perspective view of a front cover module of the respiratory device in accordance with the present disclosure.
Figure 9:
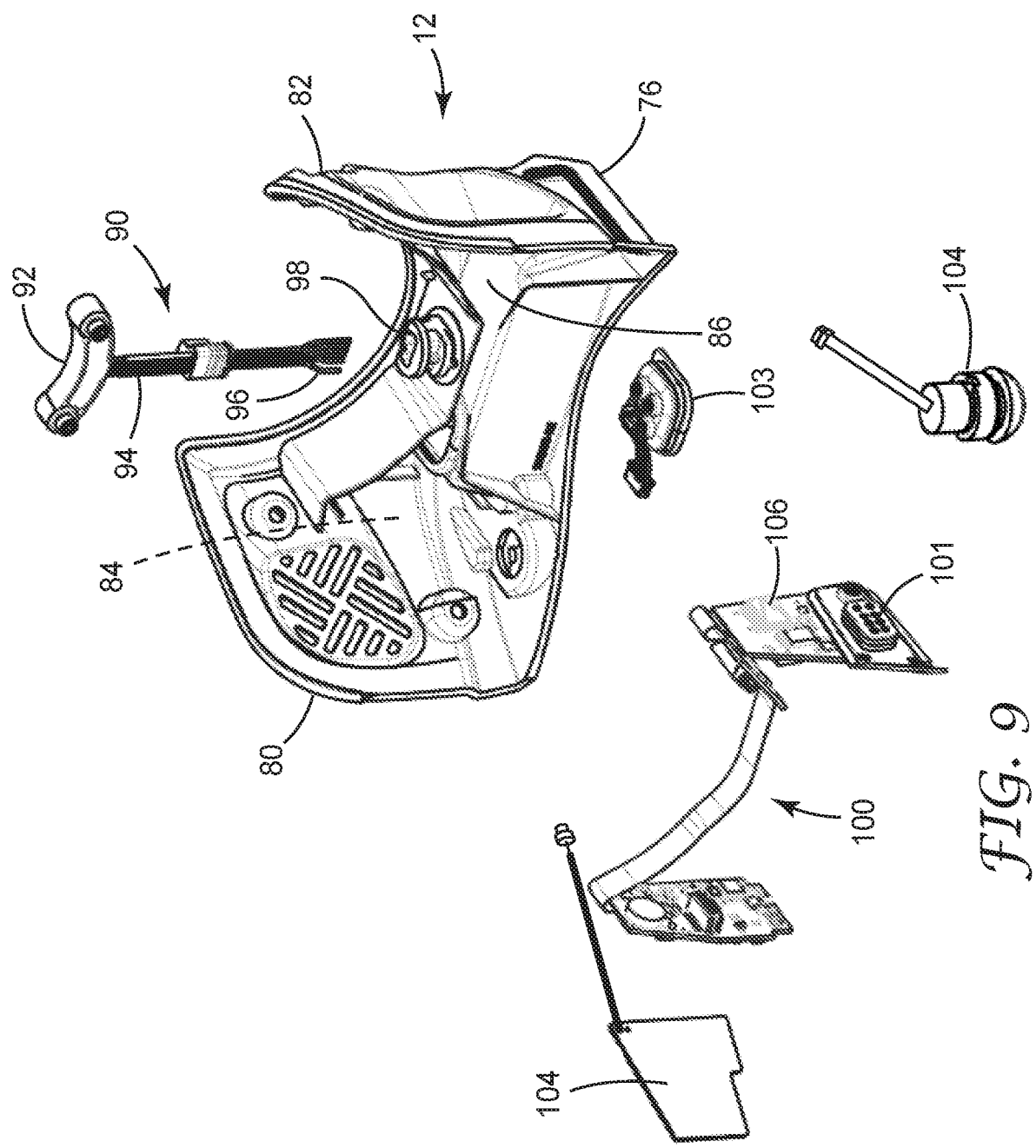
FIG. 9 shows an exploded rear view of the front cover module of FIG. 8 in accordance with the present disclosure.
Figure 10:
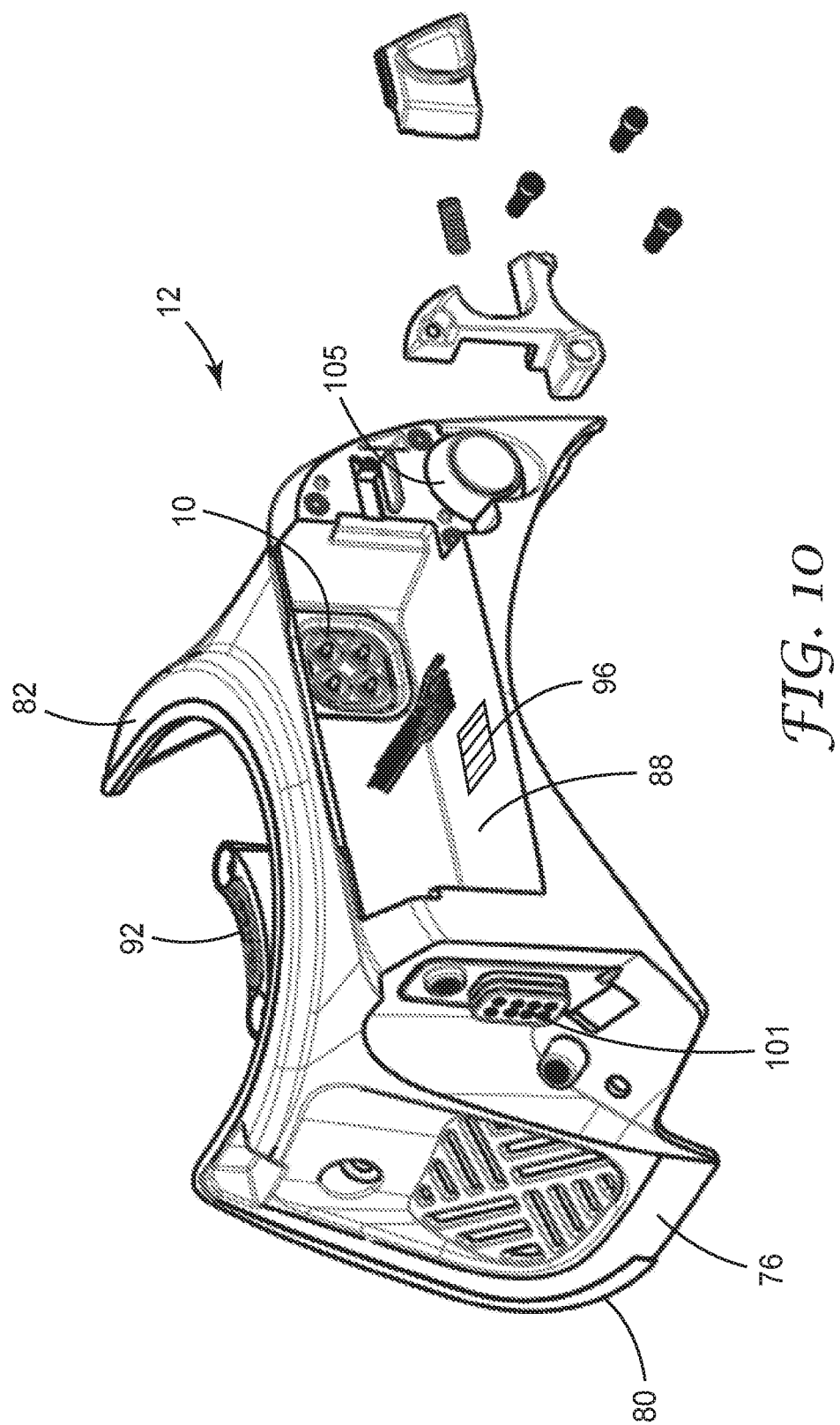
FIG. 10 shows an exploded bottom view of the front cover module of FIGS. 8 and 9 in accordance with the present disclosure.

Referring now to FIGS. 8-10, a front cover module 76 is shown. FIG. 8 shows a front perspective view of the front cover module 76, FIG. 9 shows an exploded rear view of the front cover module 76, and FIG. 10 shows an exploded bottom view of the front cover module 76. In one embodiment, the body 12 is at least partially defined by the front cover module 76. For example, in one embodiment the front cover module 76 defines a chin portion 78 of the body 12, and the chin portion 78 generally corresponds to or is aligned with the user's chin when the user is wearing the respiratory device 10. As is best seen in FIGS. 8 and 9, the front cover module 76 generally includes a proximal portion 80 and a distal portion 82 and defines a volume 84 that is sized and configured to receive and/or engage with at least a portion of the facepiece 16, the MCU 14, and/or the nosecup 20. For example, in one embodiment, the distal portion 82 of the front cover module 76 includes a curved rim that is sized and configured to at least partially follow the contour of the central aperture 46 of the MCU 14 and/or the aperture 34 of the facepiece 16.

Continuing to refer to FIGS. 8-10, in one embodiment the front cover module 76 also includes a bottom surface 86 that includes a recessed portion extending into the volume 84 that at least partially defines a battery compartment 88. The respiratory device 10 includes an electrical connector assembly 90 that has an electrical connector 92 that is removably couplable to the electrical connector 66 of the MCU 14. The electrical connector assembly 90 further has an electrical conduit 94 and a power source connector 96 that is removably couplable to the power source 24. In one embodiment, the electrical conduit 94 is a bundle of wires that extends between the electrical connector 92 and the power source connector 96. Further, in one embodiment the electrical conduit 94 passes through an aperture 98 within the bottom surface 86 of the front cover module 76. Thus, the electrical conduit 94 may be coupled to both the MCU 14 within the volume 84 defined by the front cover module 76 and the power source 24 within the battery compartment 88. As the power source 24 is located within the battery compartment 88 within the front cover module 76, the front cover module 76 provides thermal protection to (that is, shields) the power source 24 from extreme or high temperatures in the environment in which the respiratory device 10 is located and protects the power source 24 from overheating. For example, the front cover module 76 may shield the power source 24 from extreme temperatures when the respiratory device 10 is used by a firefighter in a burning building.

Continuing to refer to FIGS. 8-10, in one embodiment the respiratory device 10 includes an electronic circuit board 100 housed within the volume 84 defined by the front cover module 76. In one embodiment, the electronic circuit board 100 is connected between the MCU 14 and the electrical connector assembly 90 and/or an additional electrical connector assembly (and, therefore, the electrical function components 39). In one embodiment, the electronic circuit board 100 includes one or more electrical connectors 101 that are at least partially exposed from the front cover module 76 when the respiratory device 10 is assembled and to which one or more electrical function components 39 may be removably coupled. Thus, the electric connector 92 of the electrical connector assembly 90 and the electrical connector(s) 101 of the electronic circuit board 100 may together be referred to as the electrical interface. In one embodiment, the electronic circuit board 100 includes a plurality of electrical connectors 101 configured to place one or more electrical function components 39 (such as cameras, communication devices, or the like) in communication with the MCU 14 and/or power source 24.

Continuing to refer to FIGS. 8-10, in one embodiment the electronic circuit board 100 includes a transformer 102 that is configured to alter voltage and current passed between the electric function component(s) connected to the electrical connector assembly 90 and/or the additional electrical connector assembly 101 and the MCU 14, thus enhancing user safety even when a plurality of electrical function component(s) 39 are connected to the body 12. In one embodiment, the electronic circuit board 100 also includes a UEP connector 103, a near-field communication (NFC) antenna 104, and a power switch 105. In one embodiment, the front cover module 76 further includes a Radio Frequency ID (RFID) component 106, which may be located on the electronic circuit board 100 or at another location on the front cover module 76 or in the volume 84 or battery compartment 88.

Figure 11:
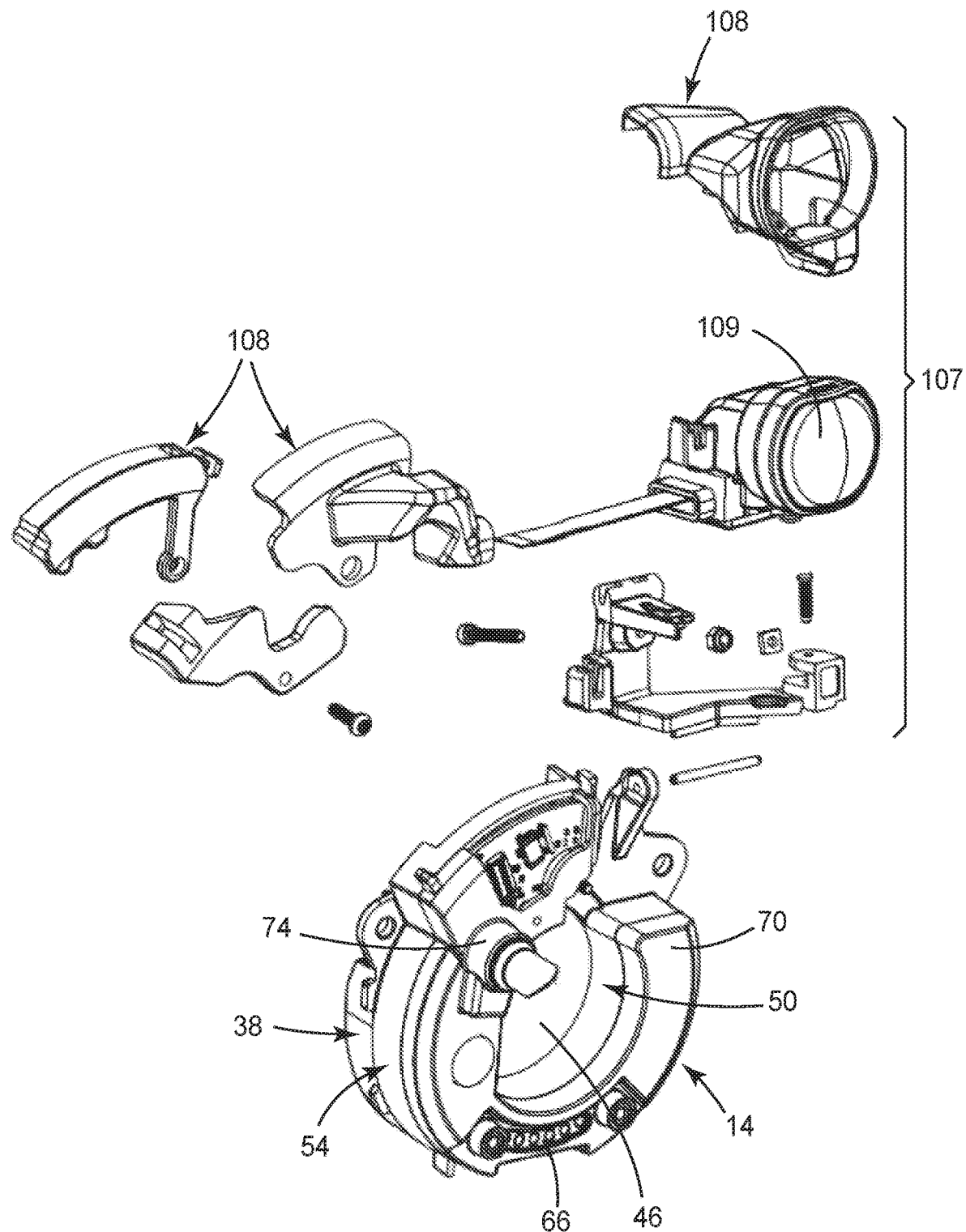
FIG. 11 shows another exemplary MCU and an exploded view of an in-mask display unit attached to the MCU in accordance with the present disclosure.
Figure 12:
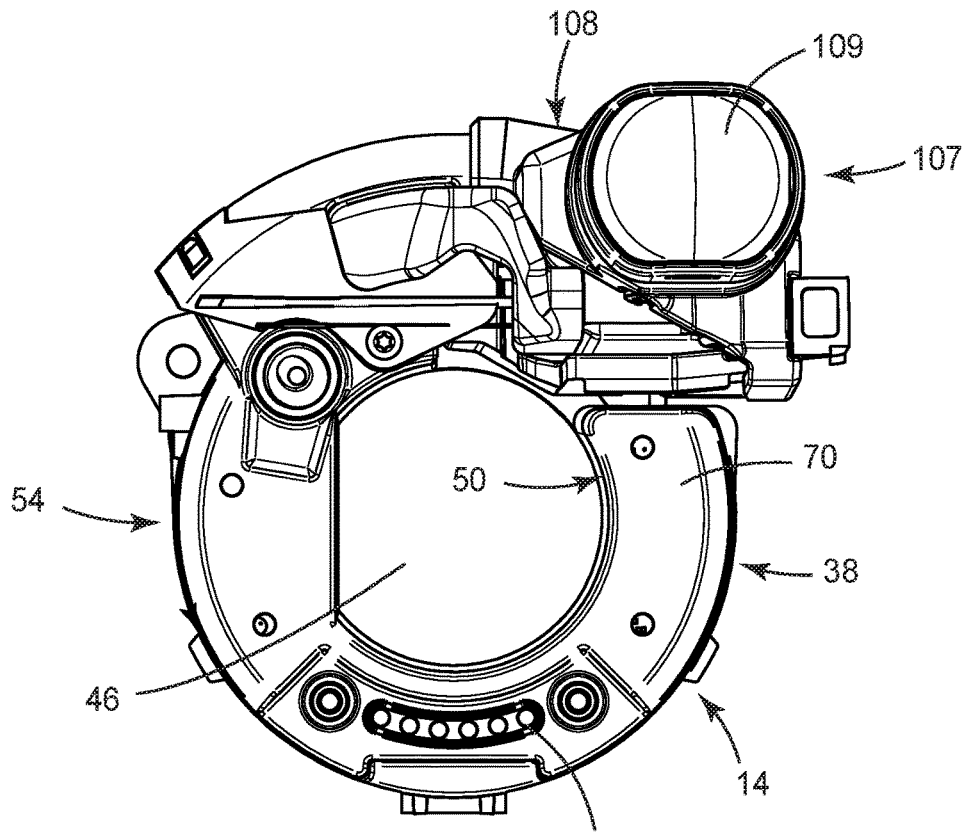
FIG. 12 shows a view of a proximal side of the MCU with in-mask display unit of FIG. 11 in accordance with the present disclosure.
Figure 13:
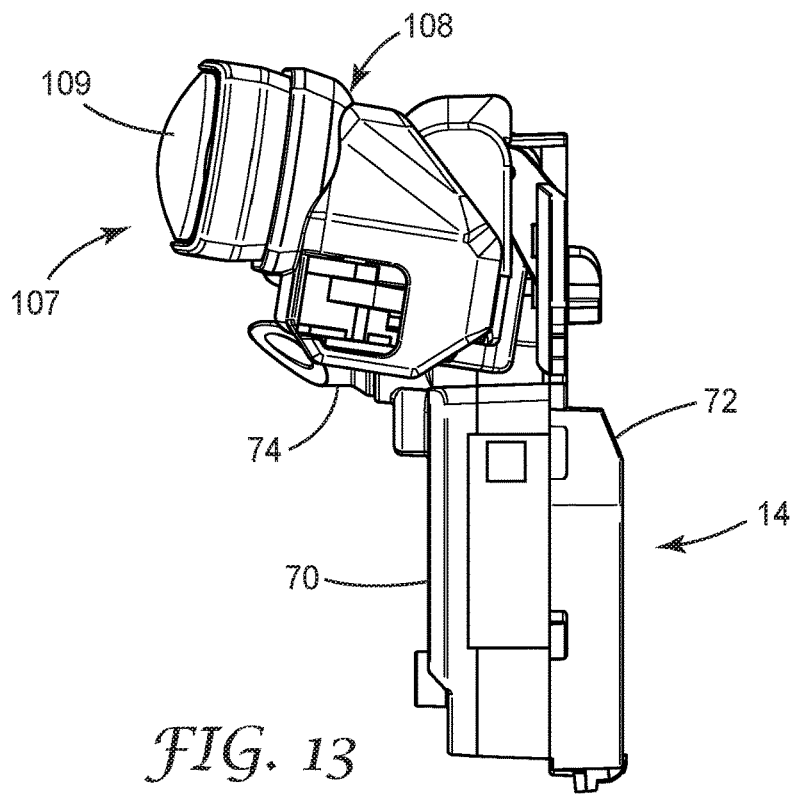
FIG. 13 shows a side view of the MCU with in-mask display unit of FIGS. 11 and 12 in accordance with the present disclosure.

Referring now to FIGS. 11-13, another exemplary MCU 14 is shown. In this embodiment, the MCU 14 includes or may be coupled to or configured to drive/control an in-mask display 107. FIG. 11 shows an MCU 14 with an exploded view of the in-mask display 107, FIG. 12 shows a view of a proximal side of the MCU 14 with in-mask display 107, and FIG. 13 shows a side view of the MCU 14 with in-mask display 107. In one embodiment, the in-mask display 107 is coupled to the housing 38 of the MCU 14 (such as the housing 38 shown in FIGS. 5-7), and in another embodiment the in-mask display 107 is integrated with the housing 38. The in-mask display 107 generally includes a housing 108, which may include or be composed of one or more components or pieces, and a display element 109, such as a video display. The display element 109 protrudes from the proximal side 70 of the housing 38 and, in use, the display element 109 is visible by the wearer. In some embodiments, the in-mask display 107 further includes one or more electric circuit boards, processors, electrical connectors, or the like (for example, as shown in FIG. 17) for receiving, processing, and displaying data, images, or other information to the user. In one embodiment, the in-mask display 107 includes a wireless communication module 110. For example, the respiratory device 10 may include an electrical function component 39 that is a camera, such as a thermal imaging camera (TIC) 112 (shown in FIG. 14) or a wireless communication system (shown in FIG. 15), which may be integrated with the respiratory device 10 or permanently or removably coupled to the respiratory device 10. In one embodiment, the display element 109 is in communication with the wireless communication unit 60 of the MCU 14, and the wireless communication unit 60 receives data (for example, images, thermal information, or the like) from an electrical function component 39, such as the TIC 112, and the MCU 14 transmits the received data to the in-mask display 107. Additionally or alternatively, the in-mask display 107 may include a wireless communication module 110 that received data directly from an electrical function component 39 such as the TIC 112. Further, the in-mask display 107 may be powered by the power source 24 through the in-mask display's 107 connection to the MCU 14. Additionally or alternatively, the in-mask display 107 may include its own power source (not shown) and/or may be directly connected to the power source 24. Further, in one embodiment, the in-mask display 107 includes a wireless communication unit (such as Bluetooth® chip, and which may include a wireless voice amplifier) that is configured to communicate sound and/or data to one or more remote devices simultaneously.

Figure 14:
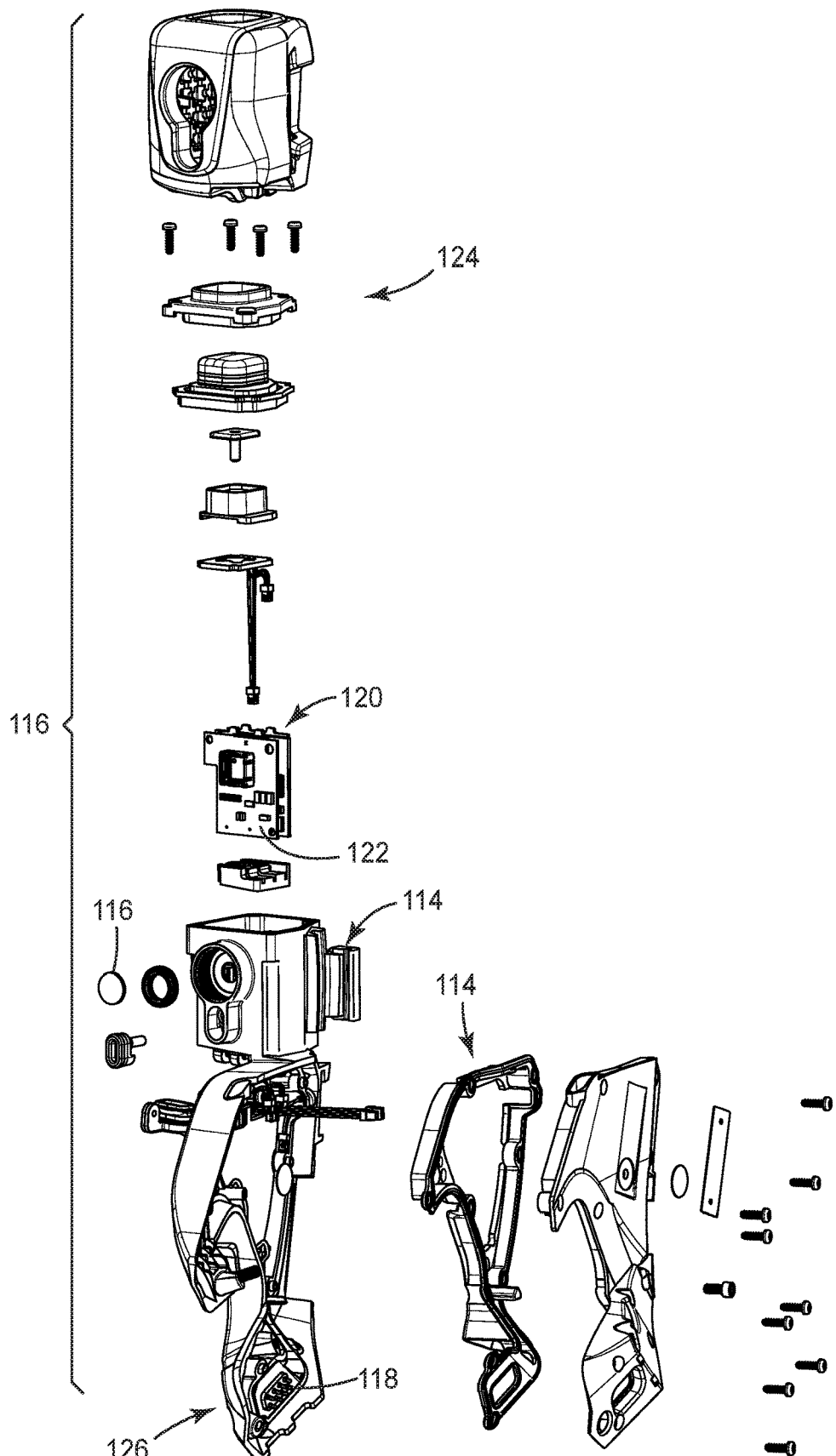
FIG. 14 shows an exploded view of a thermal imaging camera in accordance with the present disclosure.

Referring now to FIG. 14, an exploded view of a thermal imaging camera (TIC) 112 is shown. The TIC 112 is an exemplary electrical function component 39, and is shown as such in FIGS. 2 and 3, where it is indicated with reference number 39/112. The TIC 112 generally includes a housing 114, one or more lenses 116, one or more electrical connectors 118, and one or more sensors such as thermal sensors, infrared sensors, and/or visible light sensors (not shown). In some embodiments, the TIC 112 further includes one or more electric circuit boards, processors, electrical connectors, or the like (generally indicated in FIG. 14 as 120) for receiving, processing, and transmitting data, images, or other information to the in-mask display 107 and/or to a remote computer or device. Further, the TIC 112 may be powered by the power source 24 through the electrical connector 92 or other connector. Additionally or alternatively, the TIC 112 may include its own power source (not shown). Further, in one embodiment, the TIC 112 includes a wireless communication module 122 (such as Bluetooth® or a Bluetooth®/WiFi combination card) that is configured to communicate sound, images, and/or other data to one or more remote devices simultaneously, including to the in-mask display 107.

Continuing to refer to FIG. 14, in one embodiment, the housing 114 is elongate with the lens(es) 116 at a first end 124 and at least one electrical connector 118 at a second end 126 opposite the first end 124. Thus, the housing 114 may be configured such that an electrical connector 120 may be coupled to an electrical connector 92 of the front cover module 76 near the user's chin and the lens(es) 116 may be optimally positioned near the user's eyes for recording images from the environment.

Figure 15:
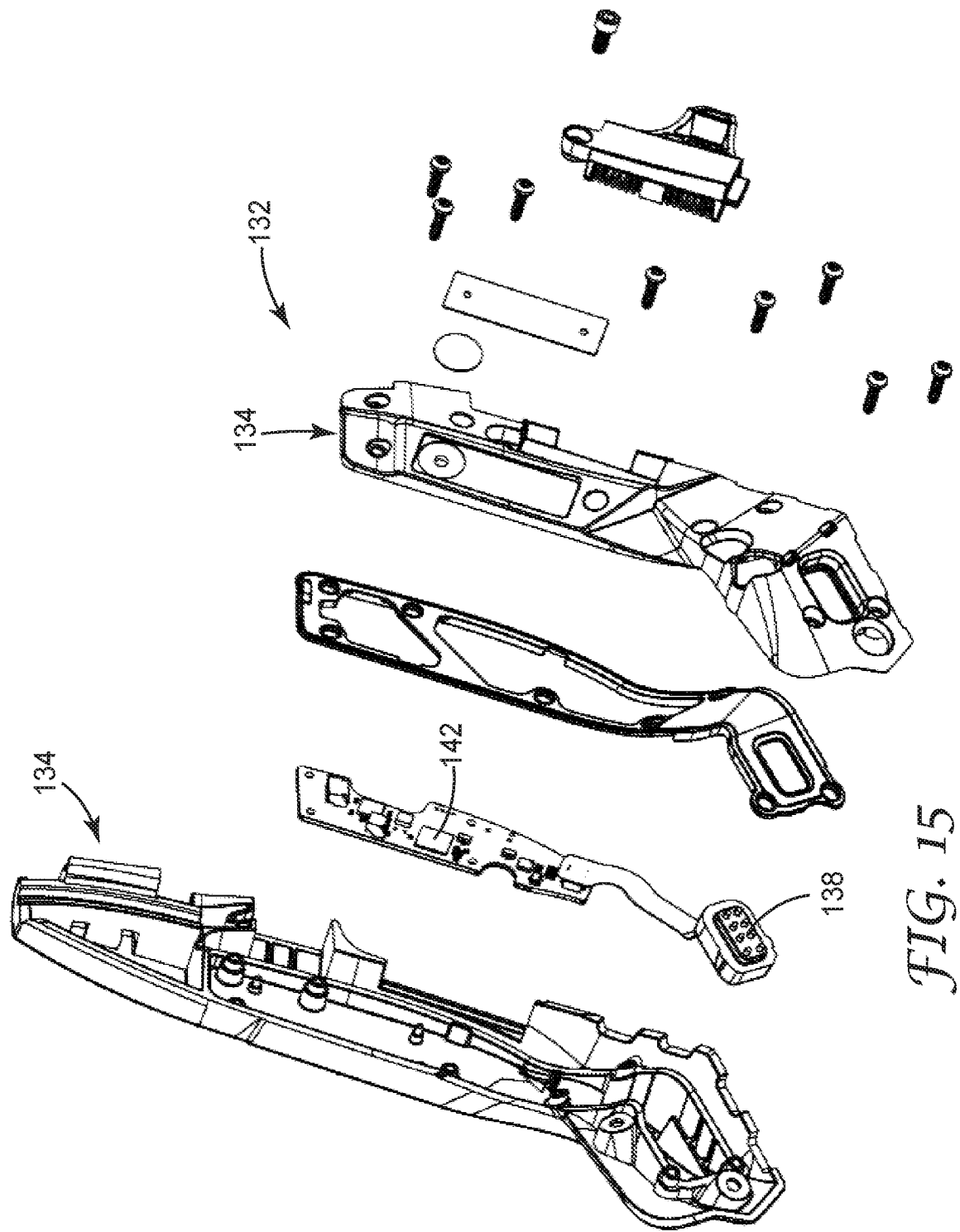
FIG. 15 shows an exploded view of a wireless communication system in accordance with the present disclosure.

Referring now to FIG. 15, an exploded view of a wireless communication system 132 is shown. The wireless communication system 132 is an exemplary electrical function component 39, and is shown as such in FIGS. 2 and 3, where it is indicated with reference number 39/132. For example, the wireless communication system 132 and the TIC 112 are removably couplable to the body 12 such that the wireless communication system 132 and the TIC 112 are swappable. Further in one embodiment, the TIC 112 includes components that are configurable for use as a wireless communication system and, therefore, the TIC 112 and wireless communication system 132 are functionally integrated into a single electrical function component 39. In one embodiment, the wireless communication system 132 is in communication with the microphone 75 and in one embodiment includes a housing 134 and an electrical connector 138. However, in other embodiments the wireless communication system 132 may also include a microphone 135 (for example, as shown in FIG. 17). In one embodiment, the housing 134 is integrated with the body 12 of the respiratory device 10. In another embodiment, the housing 134 is removably coupled to the body 12 of the respiratory device 10. Further, in one embodiment, the housing 134 is coupled to or integrated with the body 12 at a location on the side of the respiratory device 10, such as at a location proximate the user's chin. In some embodiments in which the TIC 112 is used, the TIC 112 is integrated with or coupled to the housing 134 of the wireless communication system 132 and the wireless communication system 132 is in communication with the wireless communication module 122 of the TIC 112. However, in other embodiments, the wireless communication system 132 includes an integrated wireless communication module, such as a Bluetooth® or combination Bluetooth®/WiFi module with amplifier. In some embodiments, the wireless communication system 132 further includes one or more electric circuit boards, processors, electrical connectors, or the like for receiving, processing, and transmitting data, sound, or other information between the user and the MCU 14 and/or to a remote computer or device. Further, in one embodiment the wireless communication system 132 is powered by the power source 24 through the electrical connector 92 or other connector. Additionally or alternatively, the wireless communication system 132 may include its own power source (not shown). Further, in one embodiment, the wireless communication system 132 includes a wireless communication module 142 (such as Bluetooth® or a Bluetooth®/WiFi combination card) that is configured to communicate sound, images, and/or other data to one or more remote devices simultaneously. In one embodiment, the wireless communication module 142 includes a digital enhanced cordless telecommunications (DECT) module configured to allow local communication using a voice-operated switch (VOX) or push-to-talk (PTT), as may be selected by the user.

In one embodiment, the respiratory device 10 is configured to be connected to a plurality of electrical function components simultaneously, such as the in-mask display 107, thermal imaging camera 112, and wireless communication system 132, with all electrical function components simultaneously being in communication with and powered by the power source 24. Further, each electrical function component may be interchangeable with another electrical function component, thereby enabling the respiratory device 10 to be usable with any of a variety of electrical function components depending on the use and/or user preference. This is in contrast with currently known respiratory devices in which each electrical function component must be powered by its own power source, which can be bulky, costly, and dangerous (for example, the excess equipment could become entangled with the user and/or other items when in use). This is also in contrast to currently known respiratory devices in which the MCU may only be in communication with one or, at most, two electrical function components at a time. Further, currently known respiratory devices include a power source that is remote from the respiratory device 10 or is located on a side of, and/or protrudes from, the body of the respiratory device, which can add bulk. Further, in such currently known respiratory devices the power source is not shielded from extreme temperatures.

Example schematic block diagrams of the MCU 14 are shown in FIGS. 16 and 17 and are described below. FIG. 16 shows a block diagram of electronic components of the MCU 14 of FIGS. 4-6 and FIG. 17 shows a block diagram of electronic components of the MCU 14 and in-mask display 107 of FIGS. 11-13.

Referring first to FIG. 16, in one embodiment the MCU 14 may include coder/decoder (CODEC) 144, accelerometer 146, wireless communication unit 60, processing circuitry 150 and connector 66. Processing circuitry 150 includes processor 154 and memory 156. CODEC 144 is configured to receive analog audio signals from microphone 155, digitize those analog audio signals and provide the digitized, i.e., sampled, audio signals to processor 154. Such audio signals may include voice commands or other utterances from a user as well as general voice discussion received from the user. Accelerometer 146 provides acceleration data, e.g., 3-dimensional acceleration data to processor 154, which acceleration data may be used by the processor for various functions that are beyond the scope of this disclosure. In some embodiments, microphone 155 can be the same as microphone 75 described with reference to FIGS. 5-7.

Wireless communication unit 60 is in data communication with processor 154 and provides wireless communications with other network devices. In some embodiments, as discussed above, wireless communication unit 60 is configured for BLUETOOTH communications, but it is contemplated that other communication technologies can be implemented.

Processing circuitry 150 may include a processor 154 and a memory 156. In particular, in addition to or instead of a processor, such as a central processing unit, and memory, the processing circuitry 150 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 154 may be configured to access (e.g., write to and/or read from) the memory 156, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, MCU 14 further has software stored internally in, for example, memory 156, or stored in external memory (e.g., database, storage array, network storage device, etc.) accessible by the MCU 14 via an external connection such as via connector 152 and/or wireless communication unit 60. The software may be executable by the processing circuitry 150. The processing circuitry 150 may be configured to control any of the methods and/or processes described herein and/or to cause such methods, and/or processes to be performed, e.g., by MCU 14. Processor 154 corresponds to one or more processors 154 for performing MCU 14 functions described herein. The memory 156 is configured to store data, programmatic software code and/or other information described herein. In some embodiments, the software may include instructions that, when executed by the processor 154 and/or processing circuitry 150, causes the processor 154 and/or processing circuitry 150 to perform the processes described herein with respect to MCU 14.

Although FIG. 16 shows connector 66 as maintaining a single connection with processor 154, this depiction is provided only for ease of explanation. It is understood that more than one connection can be provided from connector 66 to processor 154. For example, connections can include but are not limited to USB connections, and other separate serial connections such as RS485 connections. Also, it is understood that a connection via connector 66 can be used to provide power to the various components of MCU 14. Voltage converters (not shown), such as DC-DC converters can be used to provide different voltages that may be needed by the various components of MCU 14.

Also, it is contemplated that one or more components may be provided as separate hardware modules that engage with a main MCU 14 circuit board such as those described above as first electronic circuit board 56A and second electronic circuit board 56B. For example, processing circuitry 150 can be implemented on circuit board 56B (optionally along with one or more of wireless communication unit 60, accelerometer 146 and CODEC 144) that electrically engages with the circuit board 56A of MCU 14.

Referring now to FIG. 17, the MCU and the in-mask display 107 may include includes display processing circuitry 158 in electrical communication with display driver 160 and switch 162. It is noted that the components common to the embodiments of FIGS. 16 and 17 that were described with reference to FIG. 16 are not described again here for the sake of brevity. In one embodiment, switch 162 is a USB switch that allows USB communications from connector 66 to one or the other of processor 154 or display processor 164. Such USB communications may include data and/or control information to and/or from processor 154 and display processor 164.

Display driver 160 is in electrical communication with display 107 and is configured to provide the signals used to drive display 107, details of which are discussed above. CODEC 144 is configured to receive analog audio signals from microphone 155, digitize those analog audio signals and provide the digitized, i.e., sampled, audio signals to processor 154. In some embodiments, microphone 155 can be the same as microphone 75 described with reference to FIGS. 5-7.

Display processing circuitry 158 may include a display processor 164 and a memory 166. In particular, in addition to or instead of a processor, such as a central processing unit, and memory, the display processing circuitry 158 may comprise integrated circuitry for processing and/or control, e.g., one or more processors and/or processor cores and/or FPGAs (Field Programmable Gate Array) and/or ASICs (Application Specific Integrated Circuitry) adapted to execute instructions to ultimately drive display 107. The display processor 164 may be configured to access (e.g., write to and/or read from) the memory 166, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, MCU 14 further has software stored internally in, for example, memory 156, or stored in external memory (e.g., database, storage array, network storage device, etc.) accessible by the MCU 14 via an external connection such as via connector 66 and/or wireless communication unit 60. The software may be executable by display processing circuitry 158. Display processing circuitry 158 may be configured to control any of the methods and/or processes described herein and/or to cause such methods, and/or processes to be performed, e.g., to drive display 107. Display processor 164 corresponds to one or more display processors 164 for performing display functions described herein. The memory 166 is configured to store data, programmatic software code and/or other information described herein. In some embodiments, the software may include instructions that, when executed by the display processor 164 and/or processing circuitry 158, causes the display processor 164 and/or processing circuitry 158 to perform the display processes described herein.

In one embodiment, a respiratory device 10 comprises a body 12, at least a portion of the body 12 defining a volume 84; a mask communications unit (MCU) 14 at least partially located within the volume 84; at least one electrical function component 39 in communication with the MCU 14; and a rechargeable power source 24 at least partially located within the volume 84, the rechargeable power source 24 providing power to each of the at least one electrical function components 39.

In one aspect of the embodiment, the body 12 includes a chin portion 78 that is configured to correspond to a chin of the face of the user when the user is wearing the respiratory device 10, the chin portion 78 defining the volume 84.

In one aspect of the embodiment, the body 12 further includes a front cover module 76 having an electrical interface, the chin portion 78 of the body 12 being at least partially defined by the front cover module 76, the at least one electrical function component 39 being removably couplable to the electrical interface of the front cover module 76.

In one aspect of the embodiment, the front cover module 76 includes a Radio Frequency ID (RFID) component 106 configured to allow identification of the respiratory device 10.

In one aspect of the embodiment, the respiratory device 10 further comprises an electronic circuit board 100 in electrical communication with the MCU 14, the electronic circuit board 100 being at least partially located within the volume 84, the electronic circuit board 100 including: a universal expansion port (UEP) connector; a near-field communication (NFC) antenna; a power switch; and a transformer.

In one aspect of the embodiment, the transformer is in electrical communication with each of the at least one electrical function component 39.

In one aspect of the embodiment, the respiratory device 10 further comprises a regulator 26 removably coupled to the body 12, the rechargeable power 24 source being located between the respirator 26 and a face of a user when the user is wearing the respiratory device 10.

In one aspect of the embodiment, the respiratory device 10 further comprises a facepiece 16, and the regulator 26 includes an air inlet, the facepiece 16 defining an aperture 34 and being coupled to the body 12, the aperture 34 of the facepiece 16 being in fluid communication with the air inlet of the regulator 26.

In one aspect of the embodiment, the MCU 14 includes an annular housing 38 configured to circumscribe the aperture 34 of the facepiece 16.

In one aspect of the embodiment, the annular housing 38 of the MCU 14 has at least one electrical connector 66, the at least one electrical connector 66 being configured to be in electrical communication with the at least one electrical function component 39.

In one aspect of the embodiment, the at least one electrical function component 39 includes a plurality of electrical function components 39, each of the plurality of electrical function components 39 being removably couplable to the at least one electrical connector 66.

In one aspect of the embodiment, the rechargeable power source 24 is configured to provide power to all of the plurality of electrical function components 39.

In one aspect of the embodiment, the MCU 14 includes a wireless communication module 60, the wireless communication module 60 being configured to provide simultaneous wireless communication sessions to a plurality of remote devices.

In one aspect of the embodiment, the at least one electrical function component 39 includes at least one of a display system 107, a thermal imaging camera 112, and a communication system 132.

In one aspect of the embodiment, the body 12 defines an interior space 28 configured to receive at least a portion of the face of the user, the at least one electrical function component 39 including: a display system 107 located within the interior space 28 defined by the body 12, the display having a communications module 110; a thermal imaging camera 112, the thermal imaging camera 112 including a communications module 122 configured to transmit data over a personal area network using a plurality of communications protocols; and a communications system 132, the communications system 132 being a digital enhanced cordless telecommunications (DECT) system.

In one aspect of the embodiment, the display system 107, the thermal imaging camera 112, and the communication system 132 are powered simultaneously by the rechargeable power source 24.

In one embodiment, a respiratory device 10 comprises: a body 12, at least a portion of the body 12 being configured to contact a face of a user and at least a portion of the body 12 defining an interior space 28 configured to receive at least a portion of the face of the user, the body 12 including a chin portion 78 that is configured to correspond to a chin of the face of the user, the chin portion 78 defining a volume 84 therein; a mask communications unit (MCU) 14 at least partially located within the volume 84; a plurality of electrical function components 39 in electrical communication with the MCU 14, the plurality of electrical function components 39 including: a display system 107 located within the interior space 28 defined by the body 12, the display system 107 having a communications module 110, e.g. a BLUETOOTH module; a thermal imaging camera 112, the thermal imaging camera 112 including a communications module 122 such as a Bluetooth/WiFi combination communications card configured to transmit data over a personal area network; and a communication system 132, the communication system 132 being a digital enhanced cordless telecommunications (DECT) system; an electronic circuit board 100 in electrical communication with the MCU 14, the electronic circuit board 100 being at least partially within the volume 84 and including: a UEP connector; a near-field communication (NFC) antenna; a power switch; and a transformer, the transformer being in electrical communication with each of the plurality of electrical function components 39; and a rechargeable power source 24 at least partially within the volume 84, the rechargeable power source 24 providing power to each of the plurality of electrical function components 39 simultaneously.

In one embodiment, a mask communications unit (MCU) 14 for a respiratory device 10 comprises: a housing 38, the housing 38 defining a central aperture 46, the central aperture 46 being sized and configured to circumscribe an inlet aperture 34 of the respiratory device 10; and a wireless communications module 60 within the housing, the wireless communications module 60 being configured to wirelessly transmit data to a plurality of remote audio devices simultaneously, the MCU 14 being configured to be in communication with a plurality of electrical function components 39.

In one aspect of the embodiment, the MCU 14 is communicatively couplable to a video display 107.

In one aspect of the embodiment, the MCU 14 further comprises at least one electrical connector 66, the at least one electrical connector 66 being at least partially exposed from the housing 38 and being removably couplable to at least one of the plurality of electrical function components 39.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A respiratory device, comprising:
a body, at least a portion of the body defining a volume;
a mask communications unit (MCU) at least partially located within the volume;
at least one electrical function component in communication with the MCU; and
a rechargeable power source at least partially located within the volume, the rechargeable power source providing power to each of the at least one electrical function components;
wherein the body defines an interior space configured to receive at least a portion of a face of a user, the at least one electrical function component including:
a display located within the interior space defined by the body, the display having a communications module;
a thermal imaging camera, the thermal imaging camera including a first communications module configured to transmit data over a personal area network using a plurality of communications protocols; and
a second communications module, the communications module being a digital enhanced cordless telecommunications (DECT) system.

2. The respiratory device of claim 1, wherein the body includes a chin portion that is configured to correspond to a chin of a face of a user when the user is wearing the respiratory device, the chin portion defining the volume.

3. The respiratory device of claim 2, wherein the body further includes a front cover module having an electrical interface, the chin portion of the body being at least partially defined by the front cover module, the at least one electrical function component being removably couplable to the electrical interface of the front cover module.

4. The respiratory device of claim 3, wherein the front cover module includes a Radio Frequency ID (RFID) component configured to allow identification of the respiratory device.

5. The respiratory device of claim 2, further comprising an electronic circuit board in electrical communication with the MCU, the electronic circuit board being at least partially located within the volume, the electronic circuit board including:
a UEP connector;
a near-field communication (NFC) antenna;
a power switch; and
a transformer.

6. The respiratory device of claim 5, wherein the transformer is in electrical communication with each of the at least one electrical function components.

7. The respiratory device of claim 1, further comprising a regulator removably coupled to the body, the rechargeable power source being located between the regulator and a face of a user when the user is wearing the respiratory device.

8. The respiratory device of claim 7, wherein the respiratory device further comprises a facepiece and the regulator includes an air inlet, the facepiece defining an aperture and being coupled to the body, the aperture of the facepiece being in fluid communication with the air inlet of the regulator.

9. The respiratory device of claim 8, wherein the MCU includes an annular housing configured to circumscribe the aperture of the facepiece.

10. The respiratory device of claim 9, wherein the annular housing of the MCU has at least one electrical connector, the at least one electrical connector being configured to be in electrical communication with the at least one electrical function component.

11. The respiratory device of claim 10, wherein each of the electrical function components is removably couplable to the at least one electrical connector.

12. The respiratory device of claim 11, wherein the rechargeable power source is configured to provide power to all of the plurality of electrical function components.

13. The respiratory device of claim 1, wherein the MCU includes a wireless communication module, the wireless communication module being configured to provide simultaneous wireless communication sessions to a plurality of remote devices.

14. The respiratory device of claim 1, wherein the display, the thermal imaging camera, and the communications module are powered simultaneously by the rechargeable power source.

15. The respiratory device of claim 1, the MCU of the respiratory device comprising:
a housing, the housing defining a central aperture, the central aperture being sized and configured to circumscribe an inlet aperture of the respiratory device; and
a wireless communications module within the housing, the wireless communications module being configured to wirelessly transmit data to a plurality of remote audio devices simultaneously,
the MCU being configured to be in communication with a plurality of electrical function components.

16. The respiratory device of claim 15, wherein the MCU is communicatively couplable to a video display.

17. The MCU of claim 15, further comprising at least one electrical connector, the at least one electrical connector being at least partially exposed from the housing and being removably couplable to at least one of the electrical function components.

18. A respiratory device comprising:
a body, at least a portion of the body being configured to contact a face of a user and at least a portion of the body defining an interior space configured to receive at least a portion of the face of the user, the body including a chin portion that is configured to correspond to a chin of the face of the user, the chin portion defining a volume therein;
a mask communications unit (MCU) at least partially located within the volume;
a plurality of electrical function components in electrical communication with the MCU, the plurality of electrical function components including:
a display located within the interior space defined by the body, the display having a Bluetooth module;
a thermal imaging camera, the thermal imaging camera including a Bluetooth/WiFi combination communications card configured to transmit data over a personal area network; and
a communications module, the communications module being a digital enhanced cordless telecommunications (DECT) system;
an electronic circuit board in electrical communication with the MCU, the electronic circuit board being at least partially within the volume and including:
a UEP connector;
a near-field communication (NFC) antenna;
a power switch; and
a transformer, the transformer being in electrical communication with each of the plurality of electrical function components; and
a rechargeable power source at least partially within the volume, the rechargeable power source providing power to each of the plurality of electrical function components simultaneously.

* * * * *